US012582231B2

(12) United States Patent
Nakanishi et al.

(10) Patent No.: US 12,582,231 B2
(45) Date of Patent: Mar. 24, 2026

(54) HEADREST LOCKING DEVICE

(71) Applicant: TOYOTA BOSHOKU KABUSHIKI KAISHA, Aichi-ken (JP)

(72) Inventors: Masashi Nakanishi, Toyota (JP); Yuki Kano, Minokamo (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 212 days.

(21) Appl. No.: 18/442,803

(22) Filed: Feb. 15, 2024

(65) Prior Publication Data

US 2024/0306817 A1 Sep. 19, 2024

(30) Foreign Application Priority Data

Mar. 15, 2023 (JP) ................................. 2023-040793

(51) Int. Cl.
*B60N 2/812* (2018.01)
*A47C 1/031* (2006.01)

(52) U.S. Cl.
CPC .............. *A47C 1/031* (2013.01); *B60N 2/812* (2018.02)

(58) Field of Classification Search
CPC ...... B60N 2/812; A47C 1/031; F16B 2200/99
See application file for complete search history.

(56) References Cited

U.S. PATENT DOCUMENTS

| | | | |
|---|---|---|---|
| 10,576,860 B2 | 3/2020 | Switalski | |
| 11,364,830 B2 * | 6/2022 | Won ........................ | B60N 2/818 |
| 2018/0272910 A1 * | 9/2018 | Switalski ............... | B60N 2/815 |

* cited by examiner

*Primary Examiner* — Tye William Abell
(74) *Attorney, Agent, or Firm* — Greenblum & Bernstein, P.L.C.

(57) ABSTRACT

A headrest locking device comprising a headrest stay and a locking device which is provided in a headrest body which is supported by the headrest stay, wherein the locking device locks the relative movement of the headrest body in the height direction by engaging a notched groove formed in the headrest stay. The locking device comprising a lock plate which is engaged and disengaged against the notched groove by movement in the headrest width direction and a lock spring which urges the lock plate in the width direction to engage the notched groove. The lock plate and the notched groove have contact surfaces that contact each other in a planar manner at an angle facing forward or rearward oblique to the direction of force of the lock spring.

11 Claims, 5 Drawing Sheets

HEADREST LOCKING DEVICE

CROSS-REFERENCE TO RELATED APPLICATIONS

This application claims priority to Japanese patent application serial number 2023-40793, filed Mar. 15, 2023, which is hereby incorporated herein by reference in its entirety for all purposes.

TECHNICAL FIELD

The present disclosure relates to a headrest locking device. Specifically, the present disclosure relates to a headrest locking device capable of locking the vertical movement of a headrest body.

BACKGROUND

Conventional headrest has a headrest body equipped with a headrest pad and a headrest stay that supports the headrest body in a vertical movement. The headrest is equipped with a locking device capable of locking the vertical movement of the headrest body to the headrest stay. The locking device is provided in the headrest body.

The locking device locks the vertical movement of the headrest body by engaging a lock plate with a notched groove formed in the headrest stay from the side by urging force of the spring. The locking device is unlocked by pushing in a release button on the outer part of the headrest body, which disengages the lock plate from the notched groove.

SUMMARY OF INVENTION

Technical Problem

Other headrest locking device has the contact surfaces of the lock plate and the notched groove configured to face the direction of force applied by the urging force of the spring of the lock plate. Thus, when the lock plate tilts in the gap between its front and rear guide surfaces, the engagement allowance of the lock plate to the notched groove may become shallow. Therefore, the present disclosure provides the headrest locking device capable of properly locking the vertical movement of the headrest body.

Solution to Problem

According to one aspect of the present disclosure, a headrest locking device has a headrest stay that supports a headrest body and a locking device. The locking device is provided in a support member, which is either the headrest body or a headrest support to support the headrest stay. The locking device locks the relative movement in a height direction between the headrest stay and the support member by engaging a notched groove formed in the headrest stay. The locking device has a lock plate and a lock spring. The lock plate is engaged and disengaged against the notched groove by moving in the headrest width direction relatively to the support member. The lock spring urges the lock plate against the support member in the width direction to engage the notched groove in the headrest width direction. The lock plate and the notched groove have contact surfaces that contact each other in a planar manner at an angle facing forward or rearward oblique to the direction of force of the lock spring.

The lock plate is always pressed by the urging force of the lock spring to be tilted forward or rearward against the contact surface of the notched groove faces. Compared to a configuration in which the lock plate is pressed by the urging force of the lock spring to be able to tilt forward and rearward, respectively, the variation of the engagement allowance of the lock plate on the notched groove can be suppressed. Therefore, the vertical movement of the headrest body can be locked appropriately.

According to another aspect, the headrest locking device, in which a spring force action point is positioned in a front-rear direction at which the lock spring exerts an urging force on the lock plate, includes a central axis line of the cross section through the notched groove in the headrest stay. The headrest locking device locates in the area on the side toward which the contact surface of the notched groove face from that central axis line.

Therefore, the lock plate can be more appropriately pressed by the urging force from the lock spring to tilt forward or rearward against a direction that the contact surface of the notched groove faces.

According to another aspect, the area where the spring force acting point locates is between the central axis line and the front end. The front end is the end of the front side where the contact surface of the notched groove contacts the lock plate.

Therefore, the lock plate can be prevented from popping out of engagement with the notched groove by the spring force of the lock spring. The lock plate can be held in contact with the notched groove by the urging force of the lock spring even if the lock plate is not held from the front or rear during assembly.

According to another aspect, the support member in which the locking device is provided is the hollow-shaped main case comprising the headrest body. The lock plate is pressed against the inner surface of the case of the main case from the front or from the rear along the contact surface of the notched groove by the urging force of the lock spring in the locked state where it engages the notched groove.

Therefore, the lock plate is configured to always engage the notched groove with front or rear contact with the main case using the configuration of the main case of the headrest body. This allows the lock plate to always engage the notched groove in a certain configuration.

DETAILED DESCRIPTION

The configuration of a headrest locking device 3A according to an embodiment will be described with reference to FIGS. 1 to 5. In the following description, when indicating each direction such as front, rear, up, down, right and left shall refer to the respective direction indicated in each figure. The directions shown in each figure are respectively as viewed from the seated occupant of a seat 1 equipped with the headrest locking device 3A. In the following description, when specific reference figures are not indicated or when there is no corresponding sign in the reference figures, one of FIGS. 1 to 5 shall be referred to as appropriate.

Figure 1:
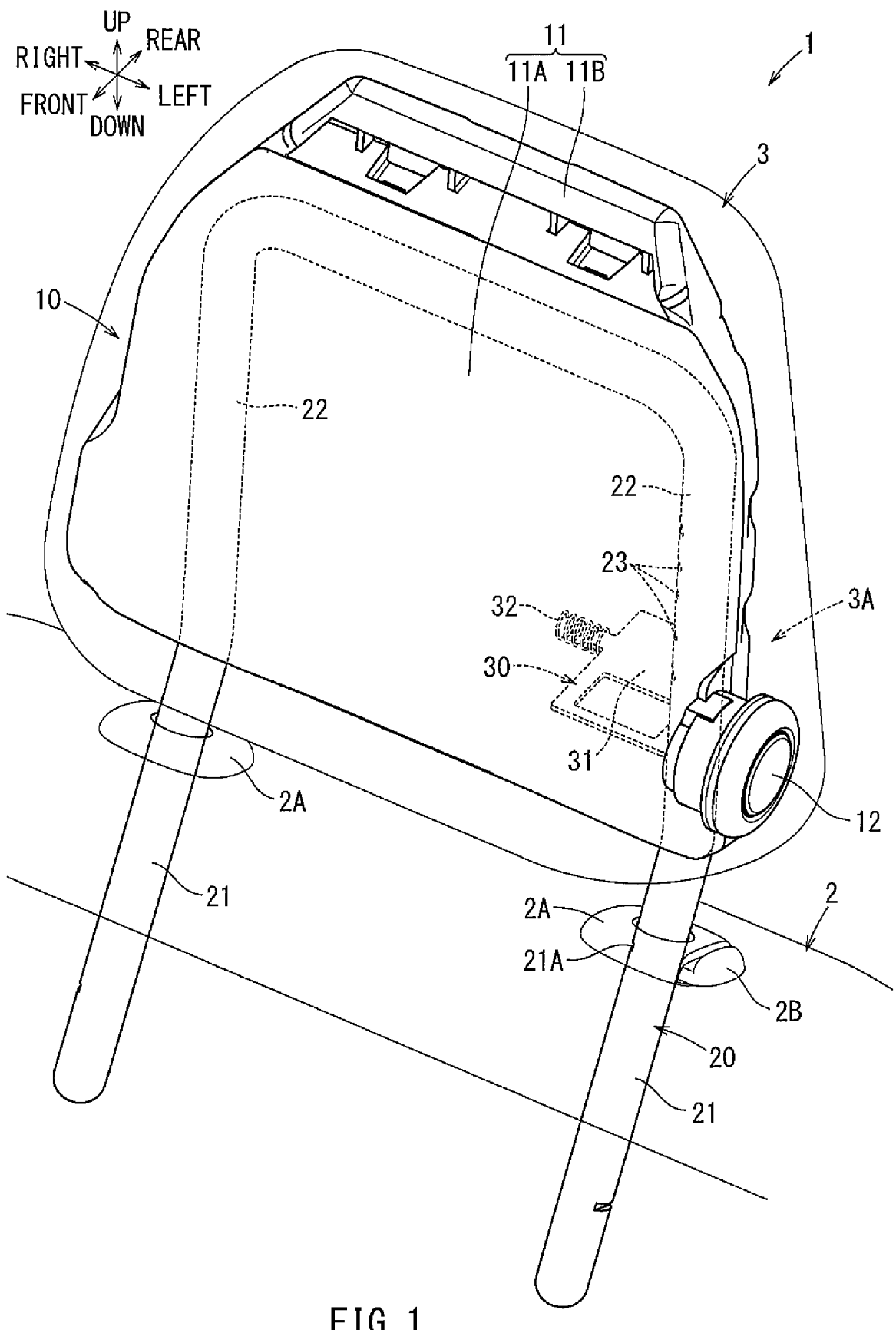
FIG. 1 is a perspective view of a headrest locking device according to an embodiment.
Figure 2:
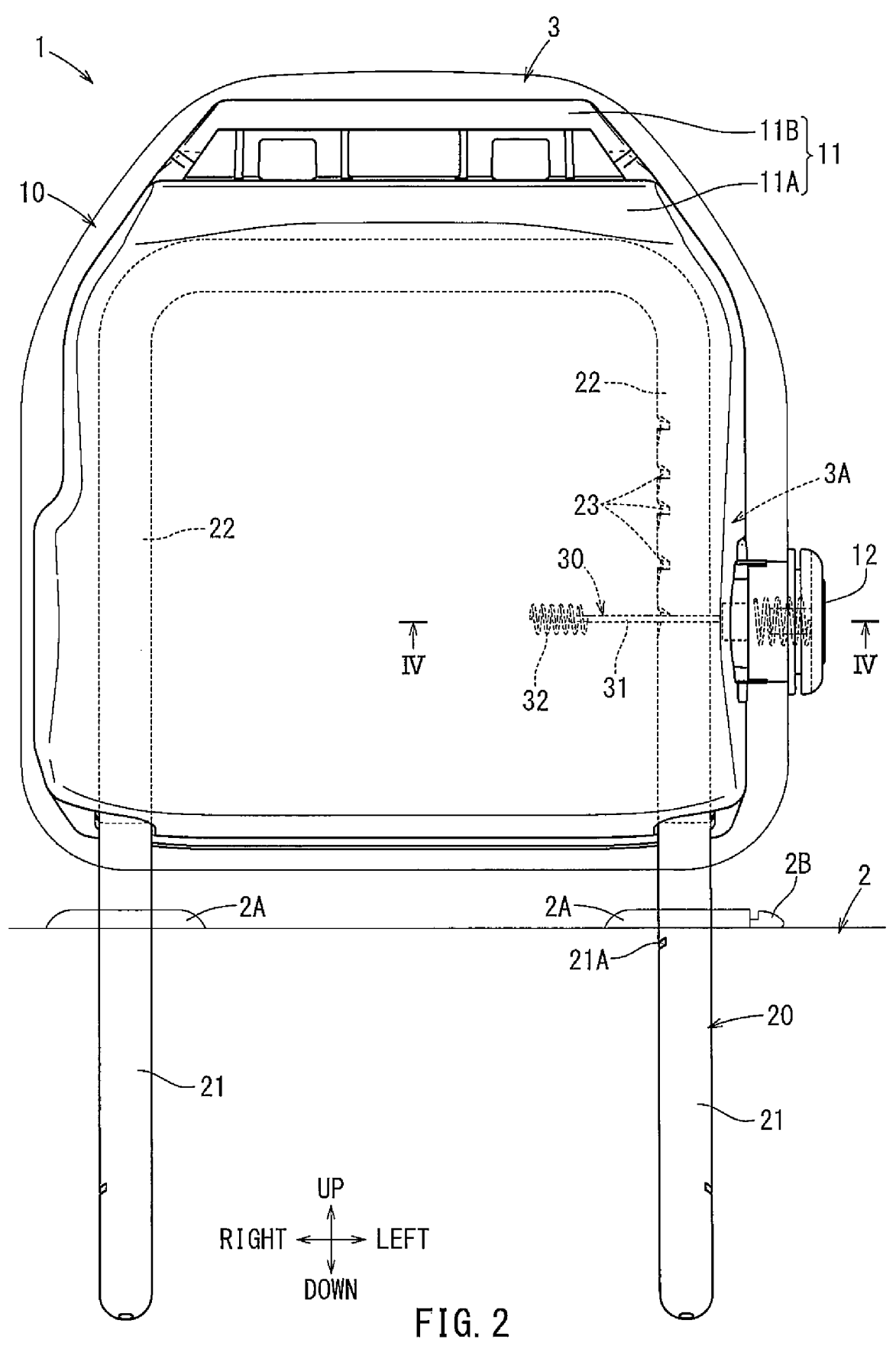
FIG. 2 is a front view of the headrest of FIG. 1.

As shown in FIGS. 1 and 2, the headrest locking device 3A is applied to a headrest 3 of the seat 1 installed on the floor of a vehicle. The seat 1 has a seat back 2 that serves as a backrest for the seated occupant, a seat cushion (not shown) that serves as a seating portion, and the headrest 3 that serves as a portion on which the seated occupant rests his/her head.

The headrest 3 is attached to a pair of right and left headrest supports 2A provided at the top of the seatback 2 by being inserted from above. Specifically, the headrest 3 has a headrest body 10 that supports the head of the seated occupant from behind and a headrest stay 20 that supports the headrest body 10 in a vertically movable manner. The headrest 3 is secured to the upper portion of the seatback 2 by the headrest stay 20 being inserted upwardly into a pair of the right and left headrest supports 2A.

The headrest 3 has the headrest locking device 3A capable of locking the vertical movement of the headrest body 10 with respect to the headrest stay 20. The headrest locking device 3A comprises a locking device 30 built into the headrest body 10 and a headrest stay 20 with which the locking device 30 engages.

The locking device 30 is provided inside a hollow-shaped main case 11, which constitutes the headrest body 10. Here, the main case 11 corresponds to the "support member" of the present disclosure. The locking device 30 locks the vertical movement of the headrest body 10 by engaging a lock plate 31 from the inside with a notched groove 23 formed on the inside surface of the headrest stay 20 by urging force of the spring.

The locking device 30 is released from the locked state described above when a release button 12 on the left side of the headrest body 10 is pushed in by the occupant. Specifically, when the release button 12 is pushed in, the lock plate 31 is pushed out of the notched groove 23 against the urging force of the spring to release the locked state. Thereby, the headrest body 10 can move up and down with respect to the headrest stay 20.

Notched grooves 23 in the headrest stay 20 are formed in multiple locations in the height direction. Thereby, the locking device 30 can lock the vertical movement of the headrest body 10 at multiple locations where the vertical movement of the headrest body 10 aligns with any of the notched grooves 23 in the height direction.

The locking device 30 is always able to properly engage the notched groove 23 with a certain amount of engagement allowance by the urging force of the spring of a lock spring 32 when engaging any of the notched grooves 23. The specific configuration of each part of the locking device 30 will be described in detail below, together with the basic configuration of the headrest 3.

Figure 3:
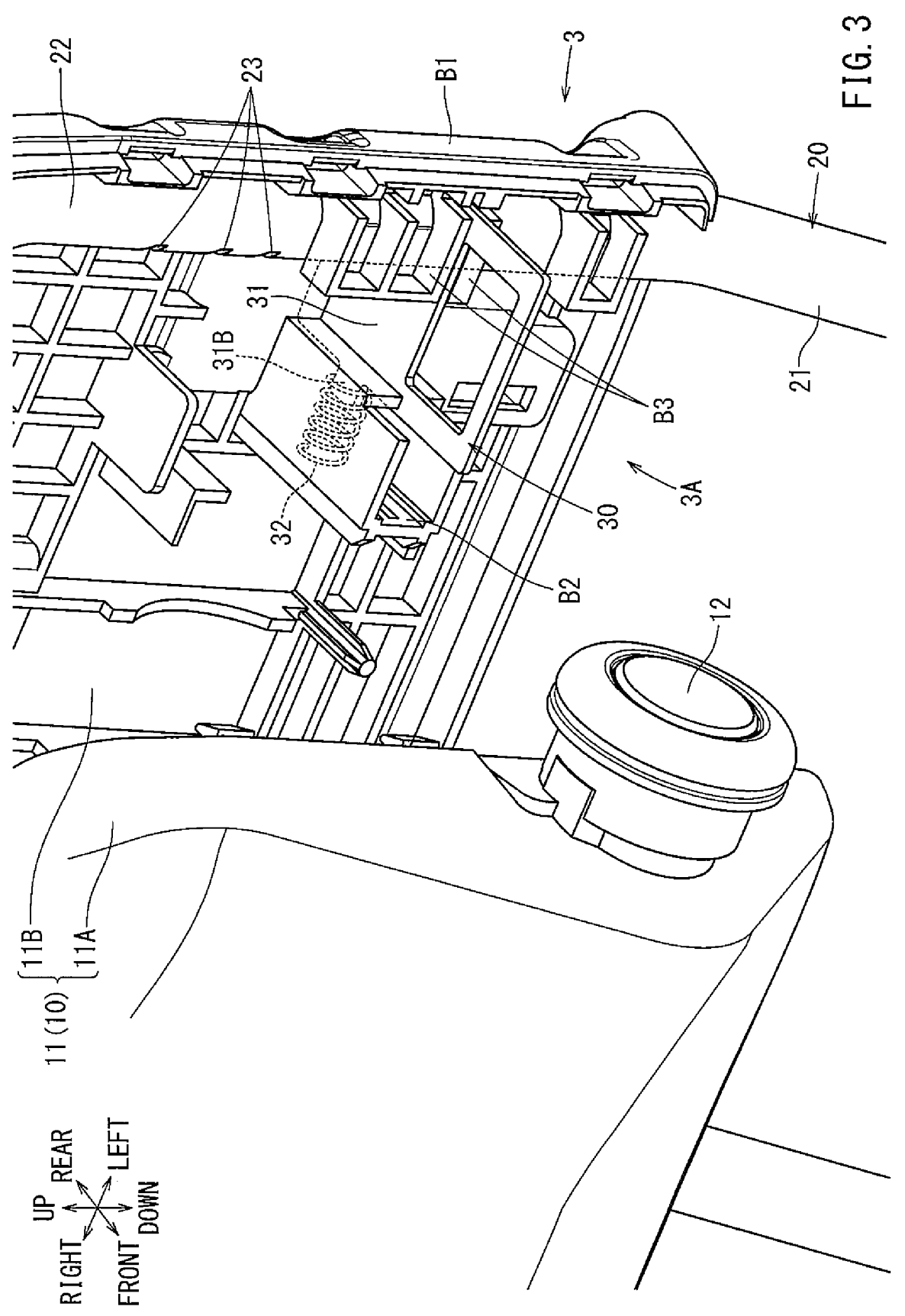
FIG. 3 is an exploded view of the headrest of FIG. 1 in which a front case removed from a rear case.
Figure 4:
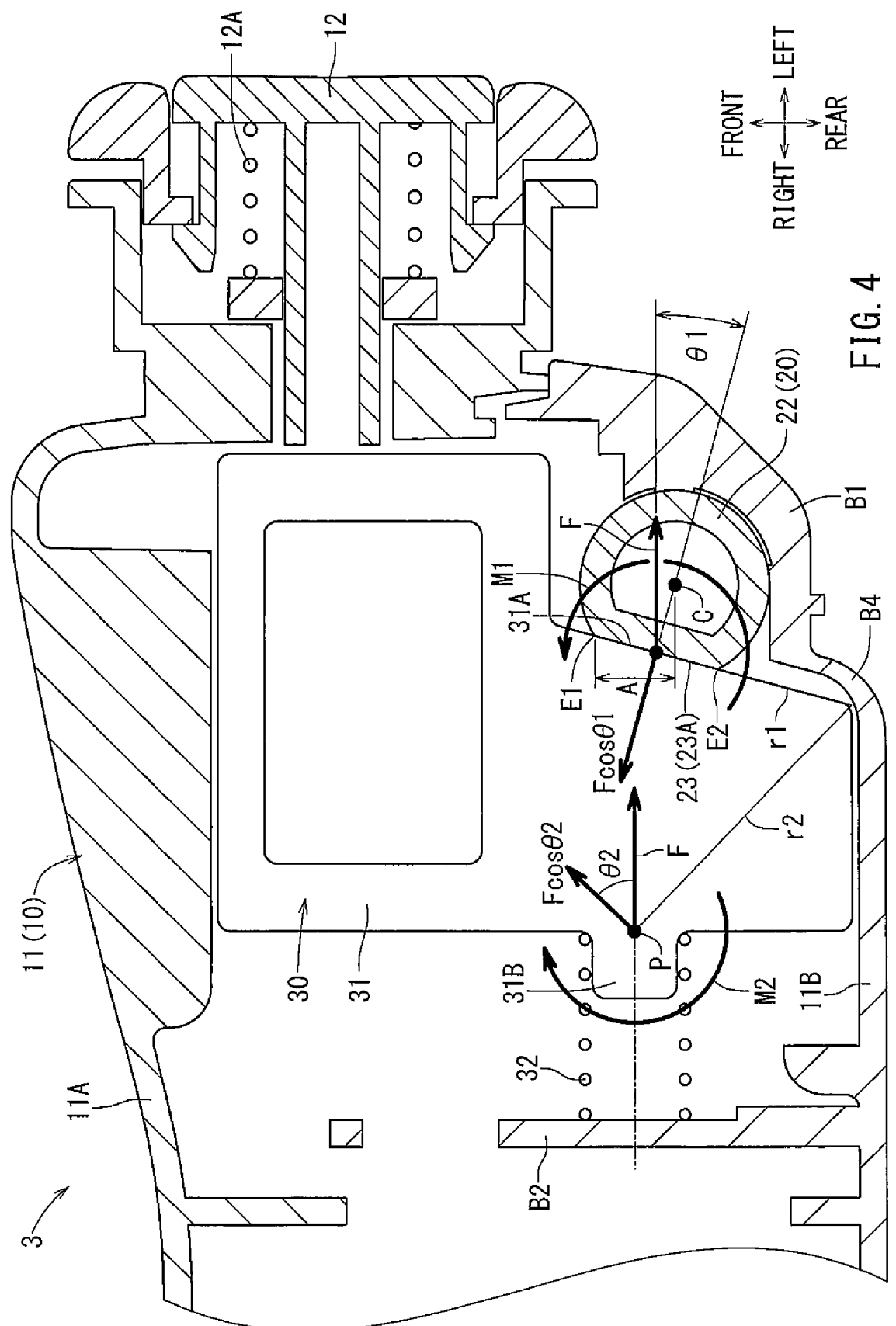
FIG. 4 is a cross-sectional view of the headrest taken along the line IV-IV of FIG. 2.

The headrest body 10 has the main case 11 made of resin, a headrest pad made of urethane foam (not shown) covering the periphery of the main case 11, and a headrest cover (not shown) covering the headrest pad. As shown in FIGS. 3 and 4, the main case 11 comprises a hollow container-shaped member divided into two parts, a front case 11A and a rear case 11B.

The main case 11 has the headrest stay 20 assembled between the front case 11A and the rear case 11B. The headrest stay 20 has an inverted U-shape in the front view. The upper bent-back portions of the headrest stay 20, excluding a right and left lower legs 21, are sandwiched between the front case 11A and the rear case 11B. A right and left upper legs 22, which bend forward and upward from the right and left lower legs 21 of the headrest stay 20, are assembled between the front case 11A and the rear case 11B of the main case 11 in a sandwiched manner.

Thereby, the main case 11 is assembled to the headrest stay 20 so that it can slide along the right and left upper legs 22 in the vertical direction. The plurality of notched grooves 23 formed on the inner surface of the headrest stay 20 described above are formed along the inner surface (the right side) of the left upper leg 22.

The headrest stay 20 is formed by bending a single round bar-shaped metal into a shape forming an inverted U-shape viewed from the front. The headrest stay 20 is attached by inserting its right and left lower legs 21 from above into a pair of right and left headrest supports 2A provided at the top of the seat back 2 as described above in FIGS. 1 and 2.

Specifically, the headrest stay 20 is locked by inserting the right and left lower legs 21 into the respective headrest supports 2A, whereby the engaging groove 21A formed on the outer surface of the left lower leg 21 is engaged with the engaging portion (not shown) provided inside the left headrest support 2A. The locking state of the headrest stay 20 by the headrest support 2A is released when a release knob 2B is pushed to the right side by the occupant. The release knob 2B is provided on the left side face of the left side headrest support 2A.

As shown in FIGS. 3-4, the locking device 30 has the lock plate 31 and the lock spring 32. The lock spring 32 urges the lock plate 31 in the direction to engage the notched groove 23. The lock plate 31 and the lock spring 32 are assembled to the rear case 11B, respectively.

As shown in FIG. 4, the rear case 11B is set in a jig (not shown) so that its front side is facing upward when the main case 11 is assembled. The rear case 11B is then assembled with the headrest stay 20, the lock plate 31, and the lock spring 32 on the top surface, which is the inner surface of the case. The headrest stay 20 is set so that the right and left upper legs 22 fit between stay guides B1, which are formed along the right and left sides of the rear case 11B and curve toward the front.

Thereby, the headrest stay 20 is set so that its right and left upper legs 22 are applied by the respective stay guides B1 from the rear side and from the outside in the headrest width direction (the right-left direction), respectively. The lock plate 31 is set in the rear case 11B so that it is inserted into the space on the right side of the left upper leg 22 from above.

Specifically, as shown in FIG. 3, the lock plate 31 is inserted between a two upper and lower ribs B3 projecting from the inner surface of the case (the front surface) of the rear case 11B. Thereby, the lock plate 31 is assembled to the rear case 11B in a state where movement in the headrest width direction is allowed between ribs B3, but movement in the vertical direction is restricted.

As shown in FIG. 4, the lock spring 32 comprises a compression spring. One end (the left end) of the lock spring 32 is passed through a spring-hanging projection 31B formed on the right side of the lock plate 31. The spring-hanging projection 31B has a projecting shape. The other end (the right end) of the lock spring 32 is set against the left side of a spring seat B2, which is a vertical plate projecting from the inner surface of the case (the front surface) of the rear case 11B. The spring seat B2 is formed at a position separated to the right from the stay guide B1 on the left side of the rear case 11B.

The left side of the spring seat B2 is shaped as a projecting plate, so that it faces straight against the left side upper leg 22 of the headrest stay 20 set in the left side stay guide B1 in the headrest width direction (the right-left direction). After these are assembled, the front case 11A is assembled to the rear case 11B so as to cover it from the front side.

By assembling the front case 11A as described above, the right and left upper legs 22 of the headrest stay 20 are sandwiched between the front case 11A and the rear case 11B so that the sliding described above is possible. Furthermore, the lock plate 31 is sandwiched between the front surface, which is the inner surface of the case of the rear case 11B, and the rear surface, which is the inner surface of the case of the front case 11A, with a slight gap in the front-rear direction.

Accordingly, the lock plate 31 is guided between the front surface of the rear case 11B (the case inner surface) and the rear surface of the front case 11A (the case inner surface) from the front-rear side so that it can move along these surfaces in the headrest width direction. The front surface of the rear case 11B and the rear surface of the front case 11A, which sandwich the lock plate 31 from the front and rear sides, are parallel to each other. The lock plate 31 is shaped so that the rear edge facing the front surface of the rear case 11B and the front edge facing the rear surface of the front case 11A are parallel to each other.

The left side of the rear portion of the lock plate 31 is the engaging portion, which is inserted between the left upper leg 22 of the headrest stay 20 and the spring seat B2 of the rear case 11B. The engaging portion engages with the notched groove 23 of the upper leg 22 by the urging force of the lock spring 32. The left side edge of the lock plate 31 and the bottom of the groove of the notched groove 23 have contact surfaces 31A, 23A, which contact each other in a plane when the lock plate 31 is engaged.

The contact surface 23A of the notched groove 23 comprises a flat surface cut in a right oblique forward-facing shape. The contact surface 23A of the notched groove 23 is formed to straddle the central axis line C of the cross section of the upper leg 22 front to rear. The contact surface 23A of the notched groove 23 is shaped such that its face straight direction (the normal direction) faces forward at an angle to the right. The contact surface 31A of the lock plate 31 comprises a flat surface cut to a shape facing left obliquely rearward in alignment with the orientation of the contact surface 23A of the notched groove 23. The contact surface 31A of the lock plate 31 is formed to the rear end position of the lock plate 31. The contact surface 31A of the lock plate 31 is shaped so that its face straight direction (the normal direction) faces left obliquely rearward.

The contact surface 31A of the lock plate 31 is shaped to match (the surface contact) the contact surface 23A of the notched groove 23 when the lock plate 31 is moved between the rear case 11B and the front case 11A to the left side toward the upper leg 22 parallel to the inner surfaces of these cases. In other words, the contact surface 31A of the lock plate 31 is shaped to be parallel to the contact surface 23A of the notched groove 23 when the lock plate 31 is not tilted front and rear between the rear case 11B and the front case 11A.

The lock spring 32 is provided between the spring-hanging projection 31B of the lock plate 31 and the spring seat B2 in an orientation in which the central axis line of the coil extends straight in the headrest width direction. The lock spring 32 is set so that the front-rear position of a spring force acting point P is located in the area A, which is the area between a rear end E2 and a front end E1 on the contact surface 23A of the notched groove 23. The spring force acting point P is the point at which the spring force F is exerted on the lock plate 31 with the contact point with the spring seat B2 as the fulcrum.

More specifically, the front-rear position of the spring force acting point P is set at a position more front than the center axis line C of the cross-section of the upper leg 22. With the spring force acting point P set at such a position, the lock spring 32 always presses the lock plate 31 to the left side of the upper leg 22 at a position more front than the central axis line C. Thereby, the lock spring 32 presses the lock plate 31 so that when the lock plate 31 contacts the upper leg 22, it tilts forward in the direction that the contact surface 23A of the notched groove 23 faces.

Accordingly, compared to a configuration in which the lock plate 31 is urged by the lock spring 32 to tilt forward and rearward, respectively, the variation in the amount of engagement of the lock plate 31 with the notched groove 23 can be suppressed. Therefore, the vertical movement of the headrest body 10 can be locked appropriately.

By setting the spring force action point P at the above position, when the lock plate 31 and lock spring 32 are assembled to the rear case 11B, the lock plate 31 can be held in engagement with the notched groove 23 of the upper leg 22 by the spring force F of the lock spring 32. Therefore, it is possible the lock plate 31 to be prevented from popping out of engagement with the notched groove 23 by the spring force F of the lock spring 32.

More specifically, the rear case 11B has a convex surface B4 projecting forward in a concave curved shape at the base of the stay guide B1 on the left side of its front face. The convex surface B4 is a surface against which the left rear corner of the lock plate 31 can be pressed from the right side by the lock spring 32 when the lock plate 31 is inserted into the rear case 11B from the front.

When the lock plate 31, which is urged by the lock spring 32, contacts the convex surface B4, a moment M2 is applied to the lock plate 31. The moment M2 is a moment of the magnitude of a distance $r2$ multiplied by $F{\cdot}\cos\theta2$. The distance $r2$ is the distance from the contact point where the lock plate 31 contacts with the convex surface B4 to the spring force acting point P. $F{\cdot}\cos\theta2$ is the spring force F expressed a component in the direction perpendicular to the distance $r2$. The angle $\theta2$ is the angle formed between the direction of action of the spring force F and the direction orthogonal to the distance $r2$. With the moment M2 applied, the lock plate 31 contacts in a planar manner with the contact surface 23A, in which the contact surface 31A faces diagonally forward to the right of the notched groove 23 in a perpendicular direction (the normal direction).

Thereby, a moment M1 due to the reaction force of the spring force F acting on the center of the surface acts on the contact surface 23A of the notched groove 23. The moment M1 is a moment of a distance $r1$ multiplied by $F{\cdot}\cos\theta1$. The distance $r1$ is the distance from the contact point where the lock plate 31 contacts with the convex surface B4 to the center of the contact surface 23A of the notched groove 23 where the reaction force of the spring force F acts. $F{\cdot}\cos\theta1$ is the reaction force of the spring force F expressed a component in the direction perpendicular to the distance $r1$. The angle $\theta1$ is the angle formed between the direction of action of the spring force F and the direction perpendicular to the distance $r1$.

The moment M1 due to the spring force F and the moment M2 due to the reaction force are balanced to keep the lock plate 31 engaged with the notched groove 23. However, when the spring force acting point P of the lock spring 32 is set at a position beyond the front end E1 of the contact surface 23A of the notched groove 23, the above-mentioned balance between the moments M1 and M2 cannot be obtained. Thereby, the lock plate 31 will disengage from the engagement with the notched groove 23 and pop out.

The lock plate 31 slides in the diagonally left frontward directions along the contact surface 23A of the notched groove 23 with which the contact surface 31A is in contact due to the spring force F of the lock spring 32. However, the sliding of the lock plate 31 is stopped at the midway position before it comes out of engagement with the notched groove 23 due to the sliding frictional resistance force between the contact surfaces 31A, 23A with the notched groove 23.

After the lock plate 31 is assembled to the rear case 11B, the front case 11A is assembled to the rear case 11B. Therefore, the lock plate 31 is pushed rearward by the rear surface, the inner surface of the front case 11A. With this configuration, the lock plate 31 is pushed against the rear surface of the front case 11A along the contact surface 23A of the notched groove 23 as the contact surface 31A is brought into contact with the contact surface 23A of the notched groove 23 by the spring force F of the lock spring 32.

The above lock plate 31 is pressed against the rear surface of the front case 11A, so that the lock plate 31 can always be engaged with the notched groove 23 in a constant condition. The rear portion of the lock plate 31, which is inserted between the upper leg 22 on the left side of the headrest stay 20 and the spring seat B2 of the rear case 11B, is tapered by the diagonal cut of the contact surface 31A. When inserting the lock plate 31 between the upper leg 22 and the spring seat B2, the inclined contact surface 23A of the notched groove 23 and the inclined contact surface 31A of the lock plate 31 are guided to enable the lock plate 31 to be inserted between them easily.

Figure 5:
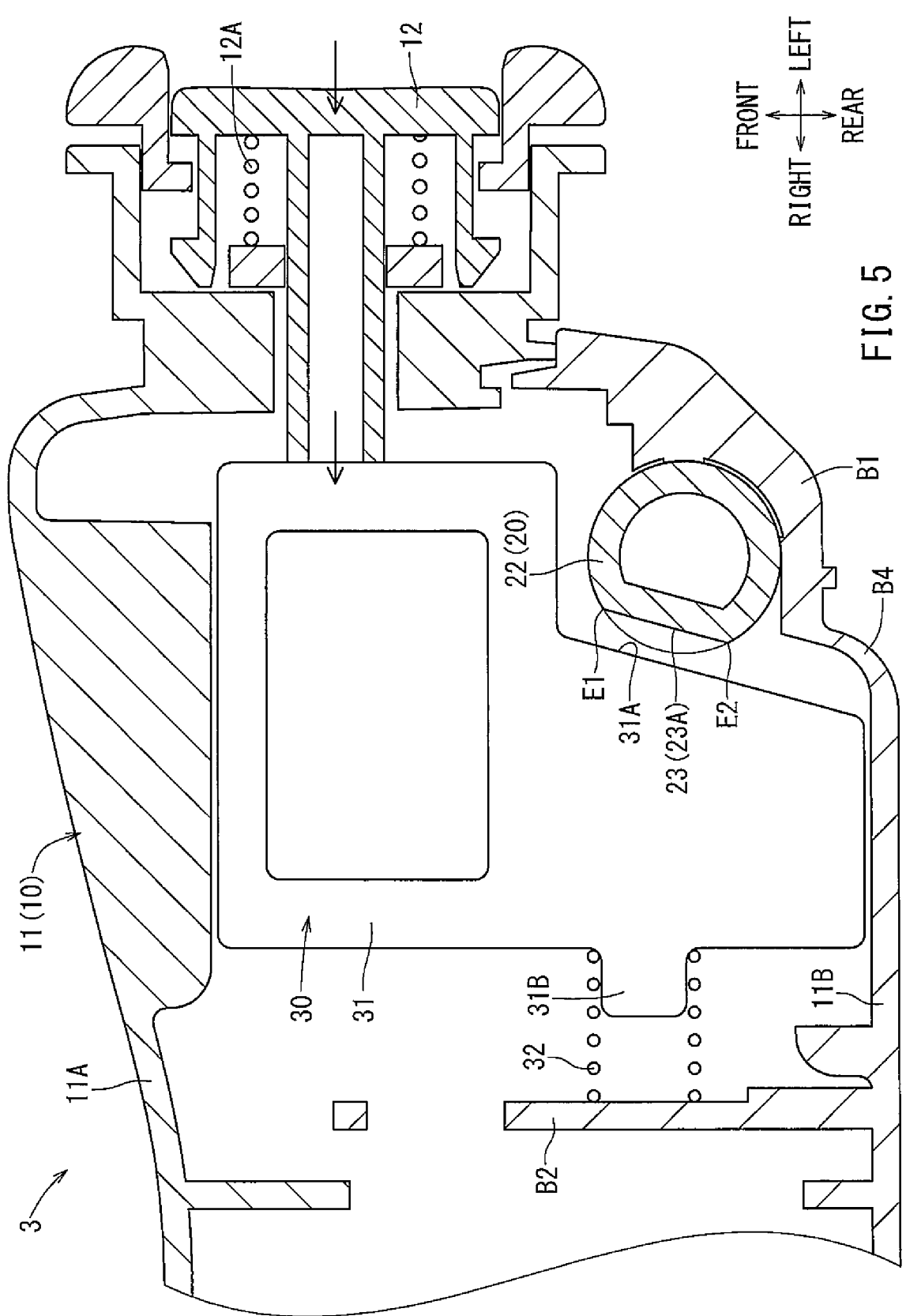
FIG. 5 is a cross-sectional view showing the state in which a lock is released by pushing in a release button.

As shown in FIG. 5, the main case 11 has a release button 12 on the left side of the front case 11A. The release button 12 is assembled to the recess formed in the left side of the front case 11A and is elastically supported by a release spring 12A, which is made of a compression spring. The lock plate 31 is engaged with the notched groove 23 and is released when the release button 12 is pushed to the right by the occupant.

When the release button 12 is pushed to the right side against the urging force of the release spring 12A, it presses the left side edge of the front portion of the upper leg 22 of the lock plate 31 that extends to the front side toward the right. Thereby, the lock plate 31 is pushed to the right against the urging force of the lock spring 32 (see FIG. 4). Therefore, it is disengaged from the engagement state (the locked state) with the notched groove 23.

In summary, the headrest locking device 3A of the embodiment has the following configuration. In the following, the reference numbers in parentheses are the reference numbers corresponding to the respective configurations shown in the above embodiment.

A headrest locking device (3A) has a headrest stay (20) that supports a headrest body (10) and a locking device (30). The locking device (30) is provided in a support member (11) that constitutes either the headrest body (10) or a headrest support (2A) that supports the headrest stay (20). The locking device (30) locks the relative movement in the height direction between the headrest stay (20) and the support member (11) by engaging a notched groove (23) formed in the headrest stay (20).

The locking device (30) has a lock plate (31) and a lock spring (32). The lock plate (31) is engaged and disengaged against the notched groove (23) by movement in the headrest width direction relative to the support member (11). The lock spring (32) urges the lock plate (31) against the support member (11) in the width direction to engage the notched groove (23) in the headrest width direction. The lock plate (31) and the notched groove (23) have contact surfaces (31A, 23A) that contact each other in a planar manner at an angle facing forward or rearward oblique to the direction of force of the lock spring (32).

According to the above configuration, the lock plate (31) is always pressed by the force of the lock spring (32) to be tilted forward or rearward against the direction that the contact surface (23A) of the notched groove (23) faces. Thereby, compared to a configuration in which the lock plate (31) is applied by the lock spring (32) to tilt forward and rearward, respectively, the variation of the engagement allowance of the lock plate (31) on the notched groove (23) can be suppressed. Therefore, the vertical movement of the headrest body (10) can be locked appropriately.

The position in the front-rear direction of a spring force acting point (P) at which the lock spring (32) exerts a spring force (F) on the lock plate (31) includes a central axis line (C) of the cross section through the notched groove (23) of the headrest stay (20), and is located in an area (A) on the side toward which the contact surface (23A) of the notched groove (23) faces from the central axis line (C). According to the above configuration, the lock plate (31) can be more appropriately pressed by the force of the lock spring (32) to be tilted forward or rearward against the direction that the contact surface (23A) of the notched groove (23) faces.

The area (A) where the spring force acting point (P) is located is between the central axis line (C) and a front end (E1). The front end (E1) is the end of the front side where the contact surface (23A) of the notched groove (23) contacts the lock plate (31). According to the above configuration, the lock plate (31) can be prevented from popping out of engagement with the notched groove (23) by the spring force of the lock spring (32). Therefore, the lock plate (31) can be held in contact with the notched groove (23) by the spring force of the lock spring (32) even if the lock plate (31) is not held from the front or rear during assembly.

The support member (11) in which the locking device (30) is provided is a hollow-shaped main case (11) comprising the headrest body (10). The lock plate (31) is pressed against the inner surface of the case of the main case (11) from the front or from the rear along the contact surface (23A) of the notched groove (23) by the spring force (F) of the lock spring (32) in the locked state where it engages the notched groove (23).

According to the above configuration, the lock plate (31) is configured to always engage the notched groove (23) with front or rear contact with the main case (11) using the configuration of the main case (11) of the headrest body (10). This allows the lock plate (31) to always engage the notched groove (23) in a certain configuration.

Although specific embodiments have been described above, the present invention can be implemented in various forms in addition to the above embodiments.

1. The headrest locking device of the present invention may be applied to seats for vehicles other than automobiles, such as railroads, as well as for passengers other than vehicles, such as aircraft and ships. The headrest locking device may also be applied to seats installed in various facilities such as sports facilities, theaters, concert halls, event halls, etc., massage seats, etc., other than vehicles.

2. In the above embodiment, the support member on which the locking device is provided may be a headrest support that supports the headrest stay, in addition to the headrest body. Specifically, a headrest support with an internal locking device as disclosed, for example, Japanese Patent Publication No. 2017-052309.

3. The lock spring that urges the lock plate against the support member in the width direction to engage the notched groove may be a tension spring or a torsion spring as well as a compression spring. Each of the contact surfaces, which are the contact surfaces of the lock plate and the notched groove, may be angled with the contact surface of the notched groove facing forward at an angle, as well as angled with the contact surface of the notched groove facing rearward at an angle. Each of the contact surfaces may contact each other face to face, including those tapering so that one face is in line contact with the other face.

4. The position in the front-rear direction of the spring force acting point at which the lock spring exerts urging force on the lock plate may be set farther from the central axis line of the cross section through the notched groove in the headrest stay than the end of the front side where the contact surface of the notched groove contacts the lock plate. Even in such a configuration, it is possible to prevent the lock plate from popping out by having the lock plate contact the inner surface of the case as the main case is assembled. The lock plate does not necessarily contact with the inner surface of the case of the main case from the front or rear when engaging the notched groove, as long as the configuration does not cause the popping out. When a plurality of lock springs are set, not all of them need to be set in the above positions, and the lock springs as a whole should be able to press against the lock plate so that the contact surfaces of the lock springs are in contact with each other.

The various examples described above in detail with reference to the attached drawings are intended to be representative of the present disclosure and are thus non-limiting embodiments. The detailed description is intended to teach a person of skill in the art to make, use and/or practice various aspects of the present teachings, and thus does not limit the scope of the disclosure in any manner. Furthermore, each of the additional features and teachings disclosed above may be applied and/or used separately or with other features and teachings in any combination thereof, to provide an improved headrest locking device, and/or methods of making and using the same.

What is claimed is:

1. A headrest locking device comprising:
a headrest stay for supporting a headrest body; and
a locking device provided in a support member that is either the headrest body or a headrest support to support the headrest stay, wherein the locking device locks a relative movement in a height direction between the headrest stay and the support member by engaging a notched groove formed in the headrest stay, and
wherein the locking device further comprises:
a lock plate configured to engage and disengage against the notched groove by a movement in a headrest width direction relatively to the support member; and
a lock spring configured to urge the lock plate against the support member in the width direction to engage the notched groove in the headrest width direction, wherein the lock plate and the notched groove have contact surfaces that contact each other in a planar manner at an angle facing forward or rearward oblique to the direction of force of the lock spring.

2. The headrest locking device according to claim 1, wherein the support member is a hollow-shaped main case comprising the headrest body and the lock plate, wherein the lock plate is pressed against an inner surface of the main case from the front or from the rear along the contact surface of the notched groove by the urging force of the lock spring in the locked state where it the lock plate engages the notched groove.

3. The headrest locking device according to claim 1, wherein
a position in a front-rear direction of a spring force action point at which the lock spring exerts an urging force on the lock plate includes a central axis line of a cross section through the notched groove in the headrest stay and is located in an area on a side from that central axis line toward which a contact surface of a notched groove face is provided.

4. The headrest locking device according to claim 3, wherein
a location of the spring force acting point is between the central axis line and a front end of the front side where the contact surface of the notched groove contacts the lock plate.

5. A headrest locking device comprising:
a headrest body having a hollow-shape;
a headrest stay having an inverted U-shape;
a main case having a front case and a rear case, wherein the headrest stay is configured to position in between the front case and the rear case;
a lock plate configured to engage and disengage against each of a plurality of notched grooves;
a lock spring configured to urge the lock plate to engage each of the plurality notched grooves; and
a release button located on an outer part of the headrest body,
wherein the lock plate and each of the plurality of notched grooves have contact surfaces that contact each other in a planar manner at an angle facing forward or rearward oblique to the direction of force of the lock spring.

6. The headrest locking device according to claim 5, wherein the lock plate has a spring-hanging projection protruding on one end of the lock plate for the lock spring to pass through.

7. The headrest locking device according to claim 5, wherein the lock spring is allocated between a spring-hanging projection and a spring seat in an orientation aligned with a central axis line of the lock spring extending straight along a headrest width direction.

8. The headrest locking device according to claim 5, wherein the lock spring is configured for pressing the lock plate to a left side of an upper left leg.

9. The headrest locking device according to claim 5, wherein the lock plate is configured to engage the each of the plurality of notched grooves via the contact surface of the each of the plurality of notched grooves and a contact surface of the lock plate.

10. The headrest locking device according to claim 9, wherein the contact surface of the each of the plurality of notched grooves has a flat surface being cut in a right oblique forward-facing shape.

11. The headrest locking device according to claim 9, wherein the contact surface of the lock plate has a flat surface being cut to a shape facing left obliquely rearward in an aligned orientation of the contact surface of the each of the plurality of notched grooves.

* * * * *